(12) United States Patent
Smith

(10) Patent No.: US 10,971,915 B2
(45) Date of Patent: Apr. 6, 2021

(54) MOUNTING BRACKET SYSTEMS FOR DEAD-END UTILITY LINES

(71) Applicant: Dovetel Communications, LLC, Bremen, GA (US)

(72) Inventor: Allen Smith, Bremen, GA (US)

(73) Assignee: Dovetel Communications, LLC, Bremen, GA (US)

( * ) Notice: Subject to any disclaimer, the term of this patent is extended or adjusted under 35 U.S.C. 154(b) by 0 days.

(21) Appl. No.: 16/433,856

(22) Filed: Jun. 6, 2019

(65) Prior Publication Data

US 2020/0389006 A1  Dec. 10, 2020

(51) Int. Cl.
*H02G 7/05* (2006.01)

(52) U.S. Cl.
CPC .................. *H02G 7/056* (2013.01)

(58) Field of Classification Search
USPC .............. 248/65, 281.4; 174/158 R
See application file for complete search history.

(56) References Cited

U.S. PATENT DOCUMENTS

| | | | | |
|---|---|---|---|---|
| 1,431,662 A * | 10/1922 | Horning | ............... | B60T 17/046 248/300 |
| 2,321,671 A * | 6/1943 | La Grotta | ............ | E04B 2/7854 52/242 |
| 2,775,422 A * | 12/1956 | Von Herbulis | ......... | H02G 7/053 248/63 |
| 2,879,964 A * | 3/1959 | Anderson | ............... | H01F 27/06 211/107 |
| 2,979,299 A * | 4/1961 | Huggins | .................. | H02G 7/08 248/67.5 |
| 3,468,571 A * | 9/1969 | Farmer | ................... | E04H 12/24 403/381 |
| 3,474,995 A * | 10/1969 | Amidon | .................... | H02G 7/20 248/218.4 |
| 3,653,622 A * | 4/1972 | Farmer | .................... | H02B 5/02 211/107 |
| 3,794,751 A * | 2/1974 | Farmer | ................. | H02G 7/205 174/40 R |
| 3,856,250 A * | 12/1974 | Farmer | .................... | H02B 5/02 211/107 |
| 4,529,838 A * | 7/1985 | Hall | ........................ | H02G 7/20 174/158 R |

(Continued)

OTHER PUBLICATIONS

Preformed Line Products, Application Procedure & Safety Considerations—Preformed Line Products—Fiberlign® Aluminum Support, www.preformed.com, Feb. 2002, pp. 1-4, Preformed Line Products, Cleveland, Ohio.

(Continued)

*Primary Examiner* — Monica E Millner
(74) *Attorney, Agent, or Firm* — Thomas B. McGurk

(57) ABSTRACT

Mounting brackets for dead-end utility lines and mounting bracket systems for dead-end utility lines are described in the present disclosure. Each mounting bracket can include a body with a front face and, a plurality of arms extending from the body with each arm comprises a hook that is configured to receive a dead-end utility line. The mounting brackets are configured to be mounted on a utility pole and to allow a plurality of dead-end utility lines to be mounted to a utility pole with a single mounting bracket.

11 Claims, 10 Drawing Sheets

(56) References Cited

U.S. PATENT DOCUMENTS

| | | | | |
|---|---|---|---|---|
| 4,596,105 | A | * | 6/1986 | Farmer .................. E04H 12/24 52/697 |
| 4,896,856 | A | * | 1/1990 | Farmer .................. H01F 27/06 211/107 |
| 4,948,924 | A | * | 8/1990 | Farmer .................. H02G 7/20 174/158 R |
| 5,193,774 | A | * | 3/1993 | Rogers .................. H01F 27/06 211/107 |
| 5,213,298 | A | * | 5/1993 | Johnson ................. H01F 27/02 174/158 R |
| 5,445,348 | A | * | 8/1995 | Caldwell ................ F16L 3/243 248/74.1 |
| D378,986 | S | | 4/1997 | Darula |
| D420,566 | S | | 2/2000 | Ely et al. |
| 6,378,821 | B1 | * | 4/2002 | McKelvy ................. H02B 5/02 211/107 |
| D469,336 | S | | 1/2003 | Votruba et al. |
| D512,903 | S | | 12/2005 | Gallien |
| D614,477 | S | | 4/2010 | Edwards |
| 7,788,875 | B2 | * | 9/2010 | Wendt .................... E04B 9/127 52/506.06 |
| 8,966,857 | B2 | * | 3/2015 | Pope ..................... E04B 1/2604 403/232.1 |
| D748,966 | S | | 2/2016 | Morinaga |
| D800,536 | S | | 10/2017 | Kelley |
| D858,262 | S | | 9/2019 | Wilson et al. |
| 10,697,516 | B2 | * | 6/2020 | Malin .................... F16G 11/14 |
| 2008/0111035 | A1 | * | 5/2008 | Thomas .................. B25B 5/006 248/125.9 |
| 2014/0008380 | A1 | * | 1/2014 | Zou ...................... F16M 13/02 220/752 |
| 2020/0003274 | A1 | * | 1/2020 | Malin .................... F16M 13/02 |

OTHER PUBLICATIONS

Preformed Line Products, Fiberlign® Aluminum Suspension for ADSS, Dec. 2006, www.preformed.com, pp. 1-8, Preformed Line Products, Cleveland Ohio.

Preformed Line Products, Fiberlign® Dielectric Dead-end for ADSS, www.preformed.com, pp. 6-5-6-8, Preformed Line Products, Cleveland Ohio.

ATKC® E-Commerce Warehouse Online Store, B-Tani Heavy Duty 2" Galvanized Trunking Bracket 2.0 MM, www.ewarehouse.atkc.com.my/BTani-Heavy-Duty-2-Galvinized-Trunking-Bracket-2-0-MM-T-1-1-2-W1-x-3-1-2-H-x-2-W2, pp. 1-7, ATKC® E-Commerce Warehouse Online Store, Malaysia.

MCP Group Ltd, Channel C Bracket HDG 4 Hole, www.mcpuk.com/mechanical-containment-c1/supports-suspensions-c332/channel-brackets-c335/channel-c-bracket-hdg-4-hole-pp2037, pp. 1-2, MCP Group Ltd, United Kingdom.

Traffic Safety & Equipment Co., Perpendicular Bracket VS-C Clamp, https://trafficsafetydirect.com/Perpendicular-bracket-VS-C-clamp, pp. 1-2, Traffic Safety & Equipment Co.,Mahwah, New Jersey.

* cited by examiner

MOUNTING BRACKET SYSTEMS FOR DEAD-END UTILITY LINES

TECHNICAL FIELD

The present disclosure is directed to mounting systems for dead-end utility lines and, more particularly, mounting bracket systems for dead-end utility lines mounted to a utility pole.

BACKGROUND

Generally, owners of utility poles charge for a dead-end utility line to be mounted to the pole. Calculation of the mounting charges is sometimes based on the number of attachments to the utility pole, such as by the number of mounting bolts drilled or screwed into the utility pole, with a separate charge for each bolt. Furthermore, challenges can arise when multiple dead-end utility lines are to be mounted to a utility pole, including increases in labor for securing separate fasteners for each utility line.

Consequently, there is a need for mounting bracket systems for dead-end utility lines that can better address these and other challenges.

SUMMARY

The present disclosure encompasses mounting bracket systems for utility lines that can provide a single attachment point for multiple dead end utility lines. The present disclosure encompasses a mounting system for dead-end utility lines comprising a utility pole; a mounting bracket mounted to the utility pole, wherein the mounting bracket comprises a bracket body comprising a first side, a second side opposing the first side, a top side, a bottom side opposing the top side, a front face disposed between the first side, the second side, the top side and the bottom side, a plurality of arms extending from the body, wherein a first arm of the plurality of arms is aligned parallel to a second arm of the plurality of arms, wherein each arm of the plurality of arms comprises a hook formed on the arm, wherein the front face comprises a lip, wherein the lip defines a fastener opening; and, a plurality of dead-end utility lines connected to the mounting bracket, wherein each dead-end utility line is connected to one hook of one arm of the plurality of arms.

In one aspect, the mounting system for dead-end utility lines can further comprise a fastener aligned in the fastener opening and attached to the utility pole, and wherein the fastener secures the mounting bracket to the utility pole. In another aspect, the plurality of arms can comprise a third arm aligned non-parallel to the first arm. In a further aspect, the third arm can be aligned perpendicular to the first arm. In yet another aspect, the third arm can be aligned collinear with the first arm. In still a further aspect, the plurality of arms can comprise a fourth arm aligned non-parallel to the first arm. In another aspect, an arm of the plurality of arms can be aligned perpendicular to the face of the mounting bracket. In yet another aspect, the plurality of arms can comprise a third arm and a fourth arm. In a further aspect, the third arm can be collinear with the first arm. In yet another aspect, the fourth arm can be aligned parallel to the third arm. In still a further aspect, the third arm can be collinear with the first arm and the fourth arm can be collinear with the second arm. In another aspect, the plurality of arms can comprise a fifth arm. In a further aspect, the fifth arm can be aligned perpendicular to the first arm and the third arm.

The present disclosure also encompasses a mounting bracket for mounting dead-end utility lines to a utility pole comprising a body comprising a first side, a second side opposing the first side, a top side, a bottom side opposing the top side, and a front face disposed between the first side, the second side, the top side and the bottom side, wherein the front face comprises a lip, wherein the lip defines a single fastener opening; and, a plurality of arms extending from the body, wherein the plurality of arms comprises a first arm and a second arm, wherein the first arm is aligned parallel to the second arm, and wherein each arm of the plurality of arms comprises a hook. In another aspect, an arm of the plurality of arms can be aligned perpendicular to the front face of the body. In still another aspect, the plurality of arms further can comprise a third arm aligned non-parallel to the first arm. In a further aspect, the plurality of arms further can comprise a fourth arm. In yet another aspect, the fourth arm can be aligned parallel to the third arm. In still another aspect, the plurality of arms further can comprise a fifth arm, and wherein the fifth arm is aligned non-parallel to the first arm.

The present disclosure also encompasses a mounting bracket for mounting dead-end utility lines to a utility pole comprising a body comprising a first side, a second side opposing the first side, a top side, a bottom side opposing the top side, and a front face disposed between the first side, the second side, the top side and the bottom side; and, a plurality of arms extending from the body, wherein the plurality of arms comprises a first arm, a second arm, a third arm, a fourth arm, and a fifth arm, and wherein each arm of the plurality of arms comprises a hook. In one aspect, the first arm can be aligned parallel to the second arm. In another aspect, the third arm can be aligned parallel to the fourth arm. In a further aspect, the fifth arm can be aligned perpendicular to the first arm. In yet another aspect, the fifth arm can be aligned perpendicular to the front face.

These and other aspects of the present disclosure are set forth in more detail below and illustrated in the drawings, which are briefly described as follows.

DETAILED DESCRIPTION

The present disclosure is directed mounting brackets and mounting bracket systems by which dead-end utility lines can be mounted to a utility pole at a single point of attachment. A plurality of dead-end utility lines can be mounted to a utility pole with a single mounting bracket encompassed by the present disclosure. The mounting brackets encompassed by the present disclosure can be attached to a utility pole with a single bolt.

As used herein, the singular forms of "a," "an," and "the" encompasses the plural form thereof unless otherwise indicated. As used herein, the phrase "at least one" includes all numbers of one and greater. As used herein, the term "and/or" refers to one or all of the listed elements or a combination of any two or more of the listed elements. As used herein, the term "utility pole" refers to a pole, made of wood, metal, such as steel, concrete, granite, fiberglass, and/or combinations thereof and/or other materials suitable for use in the application, wherein the pole, when anchored, extends upward from the ground, or other surface upon which it is disposed, about 4 m to about 40 m, and is configured to support one or more utility lines and/or related utility equipment, such as, but not limited to, transformers and/or street lights, traffic lights, and antennas. As used herein, "utility line" refers to one or more electric power lines, electrical cables, fiber optic cables, and other electrical or communications transmission lines. As used herein, the term "connected" refers to the direct or indirect linking of one component to another.

Figure 1:
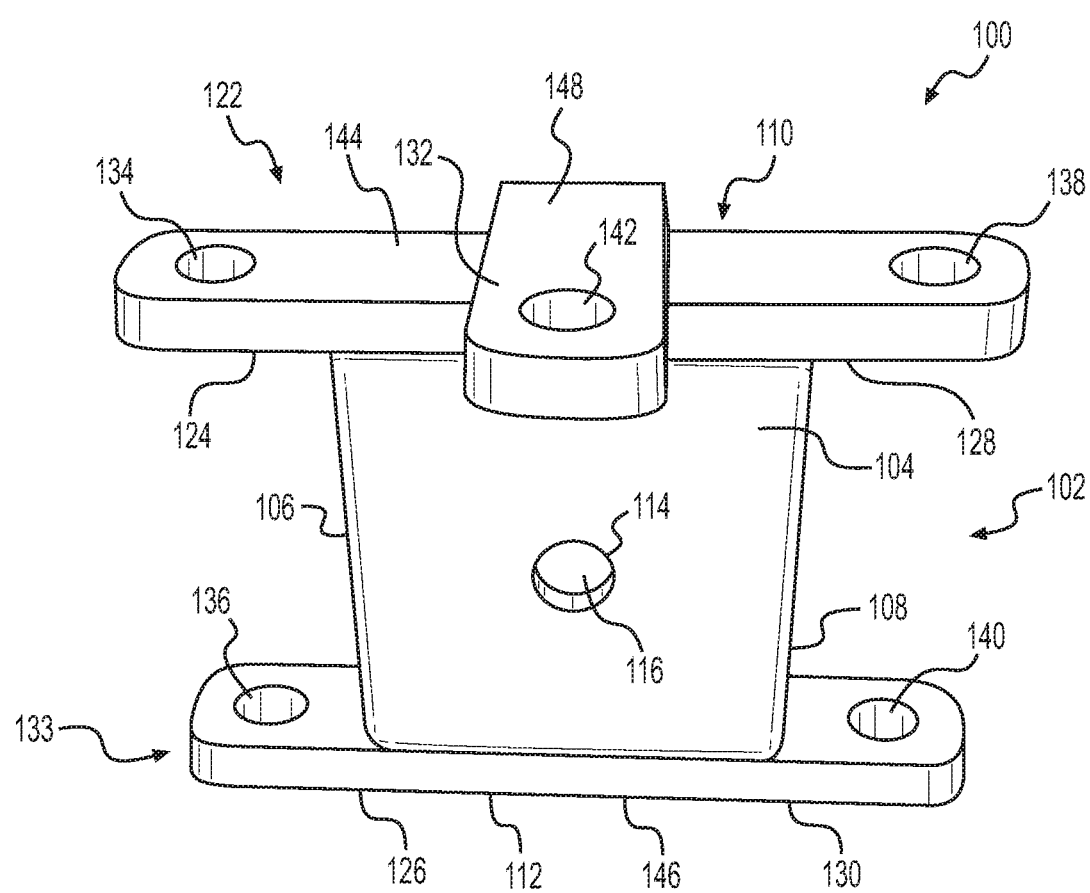
FIG. 1 illustrates a perspective view of a mounting bracket encompassing aspects of the present disclosure.
Figure 2:
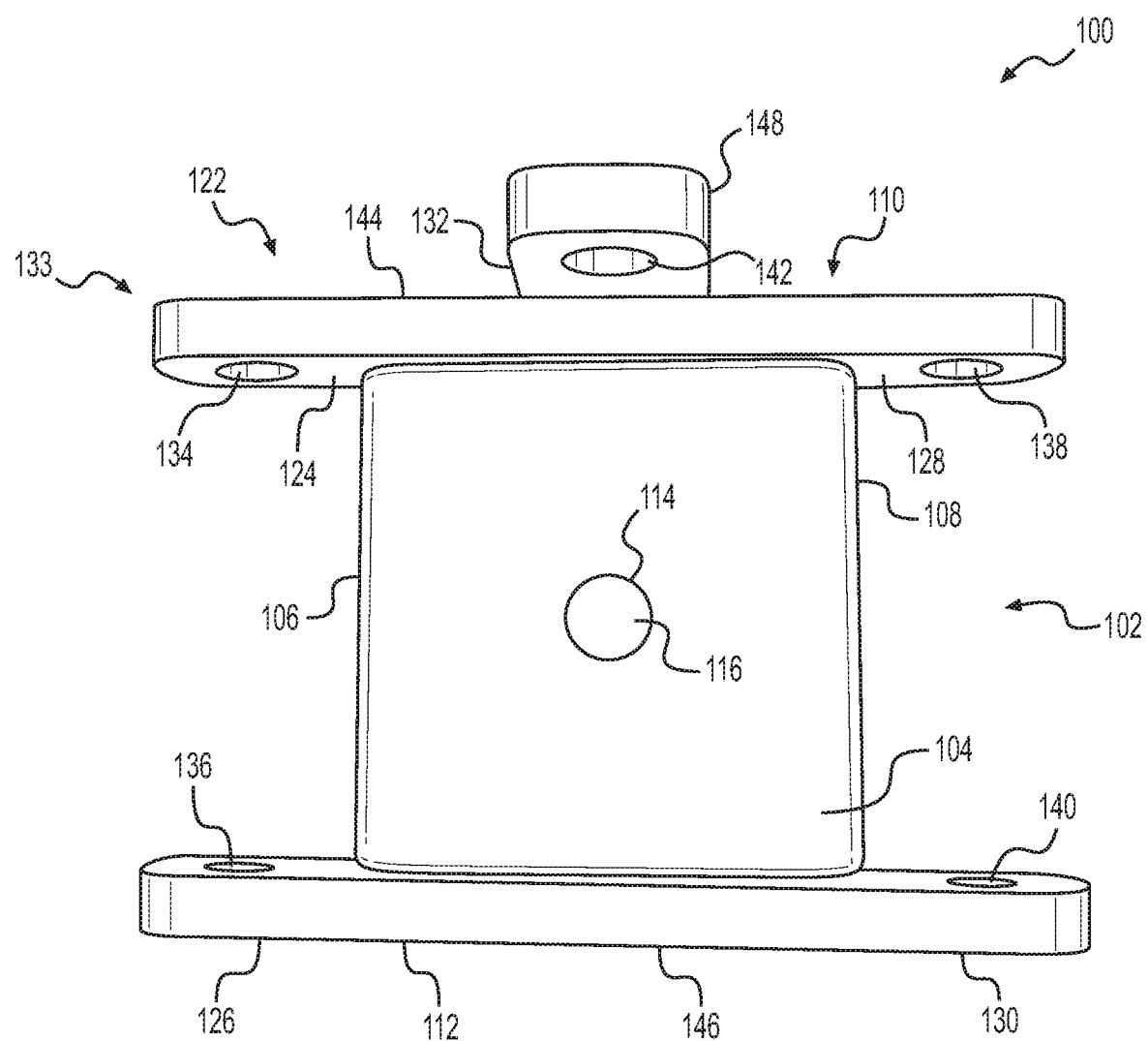
FIG. 2 illustrates a front perspective view of the mounting bracket shown in FIG. 1.

FIGS. 1-8B illustrate various aspects of mounting brackets for dead-end utility lines and mounting bracket systems for dead-end utility lines that are encompassed by the present disclosure. FIGS. 1 and 2 illustrate a mounting bracket 100 encompassing aspects of the present invention. The mounting bracket 100 comprises a body 102 formed of a weather resistant material, such as a polymeric material or galvanized steel. The body 102 comprises a face 104, a first side 106 disposed on one side of the face 104, a second side 108 opposing the first side 106, a top side 110, and a bottom side 112 opposing the top side 110. A lip 114 is formed in the face 104 and defines a fastener opening 116 that can receive a bolt, pin, or similar fastener by which the mounting bracket 100 can be attached to a utility pole 160.

The mounting bracket 100 also comprises a plurality of arms 122 mounted on the body 102 and extending outward therefrom. The plurality of arms 122 also can be comprised of the same material as the body 102. The plurality of arms 122 comprises a first arm 124 aligned along the top side 110 of the body 102 and extending from the first side 106 thereof, a second arm 126 aligned along the bottom side 112 of the body 102 and also extending from the first side 106 thereof, a third arm 128 aligned along the top side 110 of the body 102 and extending from the second side 108 thereof, a fourth arm 130 aligned along the bottom side 112 of the body 102 and also extending from the second side 108 thereof, and a fifth arm 132 aligned along the top side 110 of the body 102 and extending from the face 104 thereof. The fifth arm 132 is aligned perpendicular to the face 104 of the body 102.

The first arm 124 is aligned parallel to the second arm 126, and the third arm 128 is aligned parallel to the fourth arm 130. Each of the first arm 124, the second arm 126, the third arm 128, and the fourth arm 130 are aligned at an angle to the fifth arm 132. In one aspect, the angle of alignment of the first arm 124, the second arm 126, the third arm 128, and/or the fourth arm 130 with the fifth arm 132 is approximately 90°. In another aspect, the angle of alignment of the first arm 124, the second arm 126, the third arm 128, and/or the fourth arm 130 with the fifth arm 132 can be acute or less 90°. In yet another aspect, the angle of alignment of the first arm 124, the second arm 126, the third arm 128, and/or the fourth arm 130 with the fifth arm 132 can be obtuse or greater than 90°. In yet a further aspect, the angle of alignment of one or more of the first arm 124, the second arm 126, the third arm 128, and/or the fourth arm 130 with the fifth arm 132 can be obtuse or greater than 90°, while the angle of alignment of the other of the first arm 124, the second arm 126, the third arm 128, and/or the fourth arm 130 with the fifth arm 132 can be acute or less than 90°.

The mounting bracket 100 also comprises a top arm bar 144, a bottom arm bar 146, and a central arm bar 148, each of which is attached to the body 102. The first arm 126 and the third arm 128 form parts of the top arm bar 144, and the second arm 126 and the fourth arm 130 form parts of the bottom arm bar 146. The top arm bar 144 and the bottom arm bar 146 are both straight. As result, the first arm 126 is collinear with the third arm 128, and the second arm 126 is collinear with the fourth arm 130. The fifth arm 132 forms part of the central arm bar 148.

The mounting bracket 100 also comprises a plurality of hooks 133. The plurality of hooks 133 comprises the first hook 134 disposed on the first arm 124, the second hook 136 disposed on the second arm 126, the third hook 138 disposed on the third arm 128, the fourth hook 140 disposed on the fourth arm 130, and the fifth hook 142 disposed on the fifth arm 132. As shown in FIGS. 1 and 2, the first hook 134 and the third hook 138 are formed in the top arm bar 144, the second hook 136 and the fourth hook 140 are formed in the bottom arm bar 146, and the fifth hook 142 is formed in the central arm bar 148. The plurality of hooks 133 formed on the mounting bracket 100 takes the form of eyeholes defined in each arm of the plurality of arms 122. The present disclosure also encompasses mounting brackets that comprise a plurality of hooks, with each hook taking other forms, such as a ring, a pin, a loop, and/or a clasp.

Figure 3:
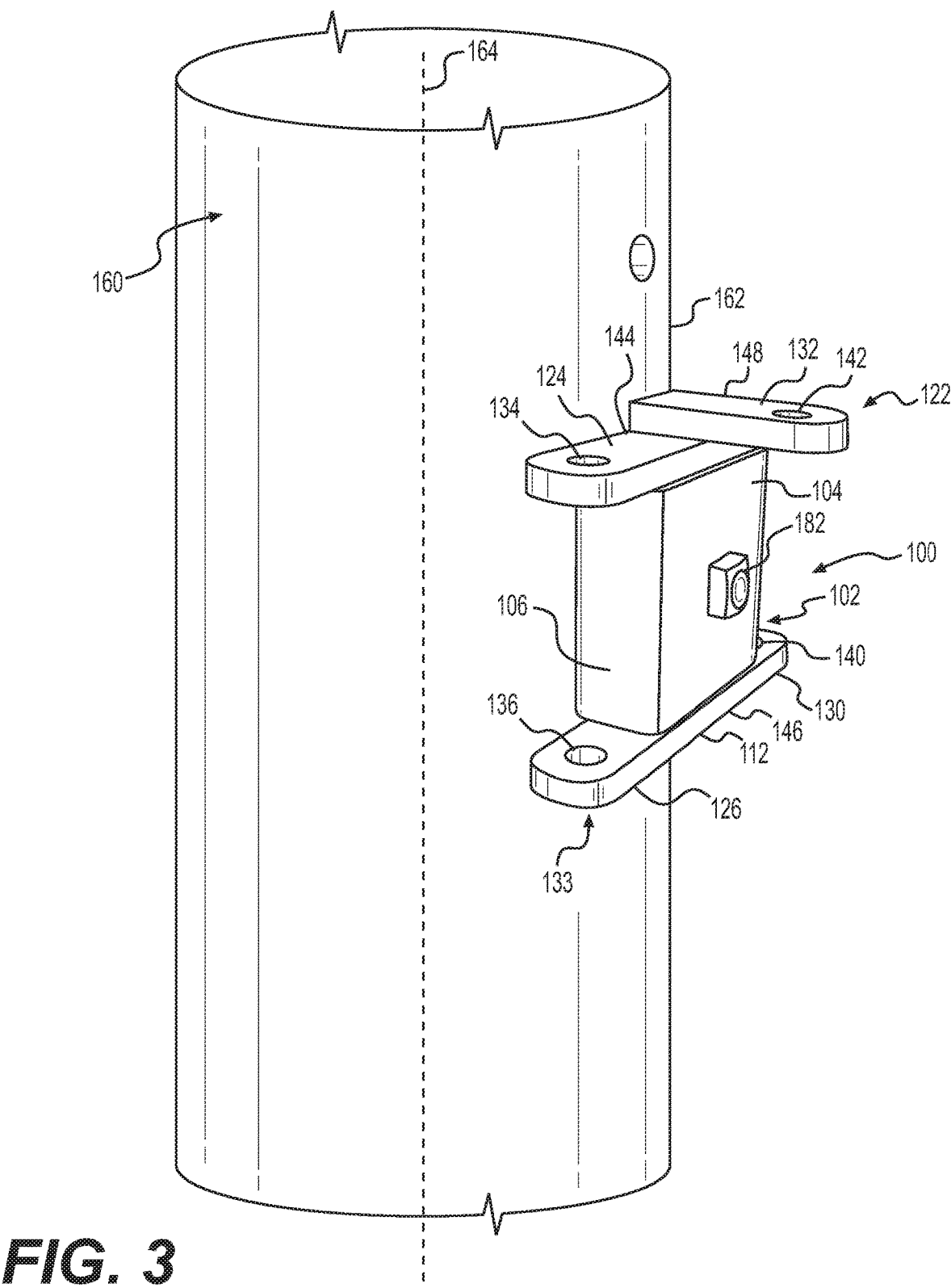
FIG. 3 illustrates a perspective view of the mounting bracket shown in FIG. 1 mounted with a bolt to a utility pole.

FIG. 3 illustrates the mounting bracket 100 mounted to the side 162 of a utility pole 160. The utility pole 160 comprises an axis 164 extending through the center of the length of the utility pole 160. The body 102 of the mounting bracket 100 is aligned adjacent the side 162 of the utility pole 160 with the face 104 aligned distal to the side 162 and facing outward from the utility pole 160. The top arm bar 144 and the bottom arm bar 146 are aligned adjacent and tangential to the side 162, and, as a result, the first arm 124, the second arm 126, the third arm 128, and the fourth arm 130 are aligned on tangential lines to the side 162 of the utility pole 160. The central arm bar 148 and the fifth arm 132 are aligned perpendicular to the axis 164 of the utility pole 160. The mounting bracket 100 is mounted to the side 162 of the utility pole 160 by a fastener 182, which in FIG. 3 is in the form of a bolt. The fastener 182 is aligned in and extends through the fastener opener 116 formed in the face 104 of the body 102. The fastener 182 is anchored in the utility pole 160, thereby securing the mounting bracket 100 to the utility pole.

Figure 4A:
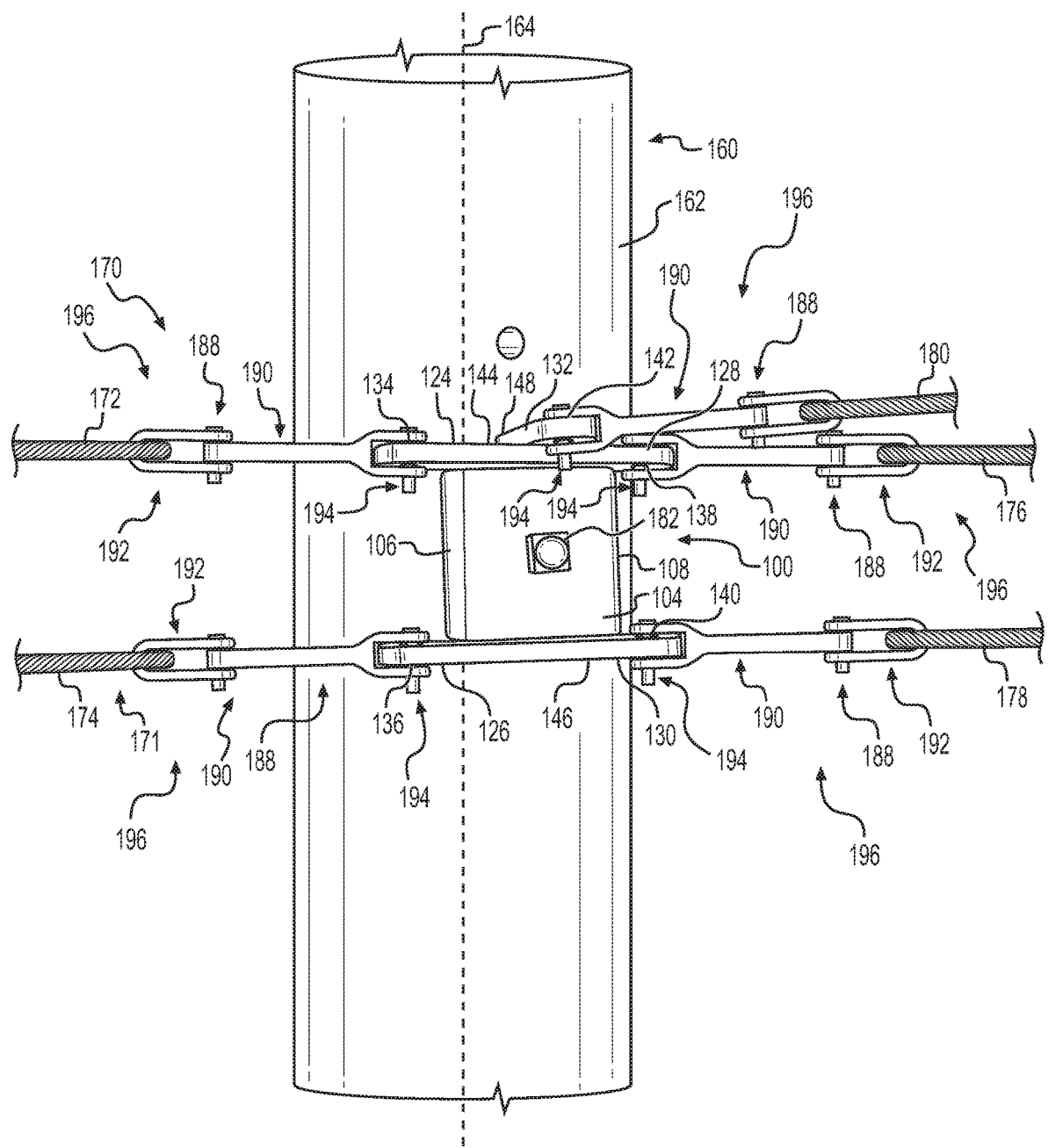
FIG. 4A illustrates a front perspective view of the mounting bracket shown in FIG. 1 mounted with a bolt to a utility pole and a plurality of dead-end utility lines mounted to the utility pole via the mounting bracket thereby forming a mounting system for dead-end utility lines encompassing aspects of the present disclosure.

FIG. 4A illustrates a mounting bracket system 170 for dead-end utility lines. The mounting bracket system 170 comprises the utility pole 160, the mounting bracket 100 mounted thereto, and a plurality of dead-end utility lines 171 mounted to the utility pole 160 by the mounting bracket 100. The plurality of dead-end utility lines 171 comprises a first dead-end utility line 172 connected to the first hook 134 on the first arm 124, a second dead-end utility line 174 connected to the second hook 136 on the second arm 126, a third dead-end utility line 176 connected to the third hook 138 on the third arm 128, a fourth dead-end utility line 178 connected to the fourth hook 140 on the fourth arm 130, and a fifth dead-end utility line 180 connected to the fifth hook 142 on the fifth arm 132.

Each of the first dead-end utility line 172, the second dead-end utility line 174, the third dead-end utility line 176, the fourth dead-end utility line 178, and the fifth dead-end utility line 180 can comprise a loop formed on the end thereof and can be connected to the respective hook on one of the arms of the mounting bracket 100 by a extension link assembly 188. In this arrangement, the connection of each dead-end utility line to the respective arm of the mounting bracket 100 is indirect. Each extension link assembly 188 can comprise an extension arm 190 having a first end to which is attached a thimble clevis 192 and a second end to which is attached an extension pin 194. The second end of each extension arm 190 comprises first and second prongs that align with and sandwich the end of the respective arm of the mounting bracket 100 with which the extension arm 190 is aligned. Each extension pin 194 is inserted through the openings in the second end of the extension arm 190 and the respective hook of the arm of the mounting bracket 100. The combination of one of the first dead-end utility line 172, the second dead-end utility line 174, the third dead-end utility line 176, the fourth dead-end utility line 178, and the fifth dead-end utility line 180 with an extension link assembly 188 forms a dead-end utility line assembly 196.

Alternatively, each of the first dead-end utility line 172, the second dead-end utility line 174, the third dead-end utility line 176, the fourth dead-end utility line 178, and the fifth dead-end utility line 180 can connect to the mounting bracket 100 without the extension link assemblies 188 by looping the utility lines, not shown, through the corresponding hooks on the arms of the mounting bracket 100 to which the dead-end utility line is connected, thereby making the connections direct between the dead-end utility lines and the respective arms of the mounting bracket 100. The mounting bracket 100 is connected by the fastener 182 to the utility pole 160. Using the mounting bracket 100, the plurality of dead-end utility lines 171 can be mounted to the utility pole 160 by a single hole formed in the utility pole 160 in which the fastener 182 is disposed. The dead-end utility lines of the plurality of dead-end utility lines 171 can be electrical power distribution or transmission lines, such as copper or steel lines, and/or communications lines, such as fiber optic lines. The dead-end utility lines of the plurality of dead-end utility lines 171 extend away from the utility pole 160 in different directions and can be aligned at differing angles in relation thereto.

Figure 4B:
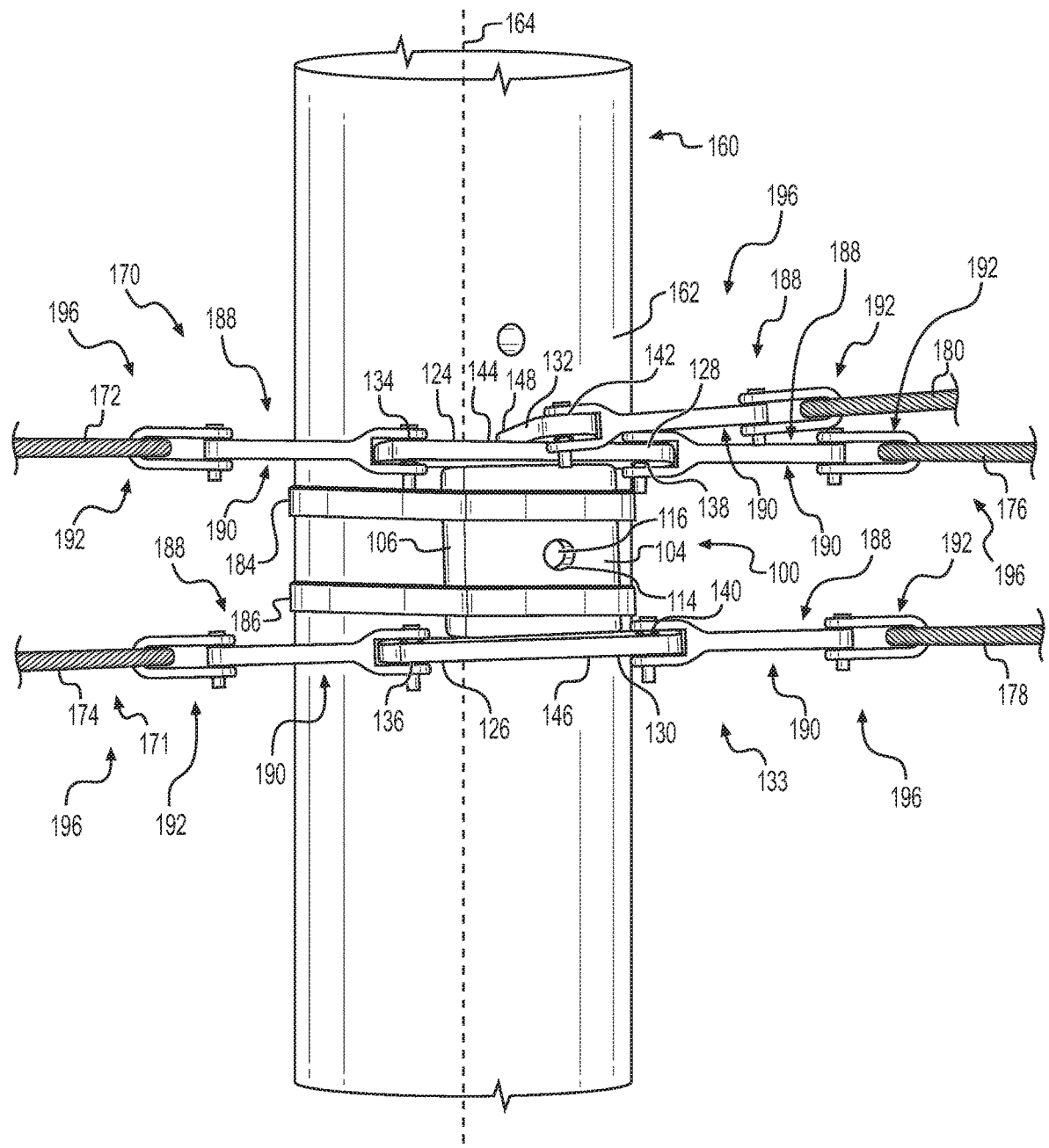
FIG. 4B illustrates a front perspective view of the mounting bracket shown in FIG. 1 mounted with two straps to a utility line and a plurality of dead-end utility lines mounted to the utility pole via the mounting bracket thereby forming another mounting system for dead-end utility lines encompassing aspects of the present disclosure.

FIG. 4B illustrates the mounting bracket system 170 for dead-end utility lines with the mounting bracket 100 connected to the utility pole 160 by a first strap 184 and a second strap 186, instead of the fastener 182. Each of the first strap 184 and the second strap 186 extend completely and tightly around the side 162 of the utility pole 160 and across the face 104 of the body 102 of the mounting bracket 100, thereby securing the mounting bracket 100 to the utility pole 160. A single strap to secure the mounting bracket 100 to the utility pole 160 is also encompassed by the present disclosure.

Figure 5:
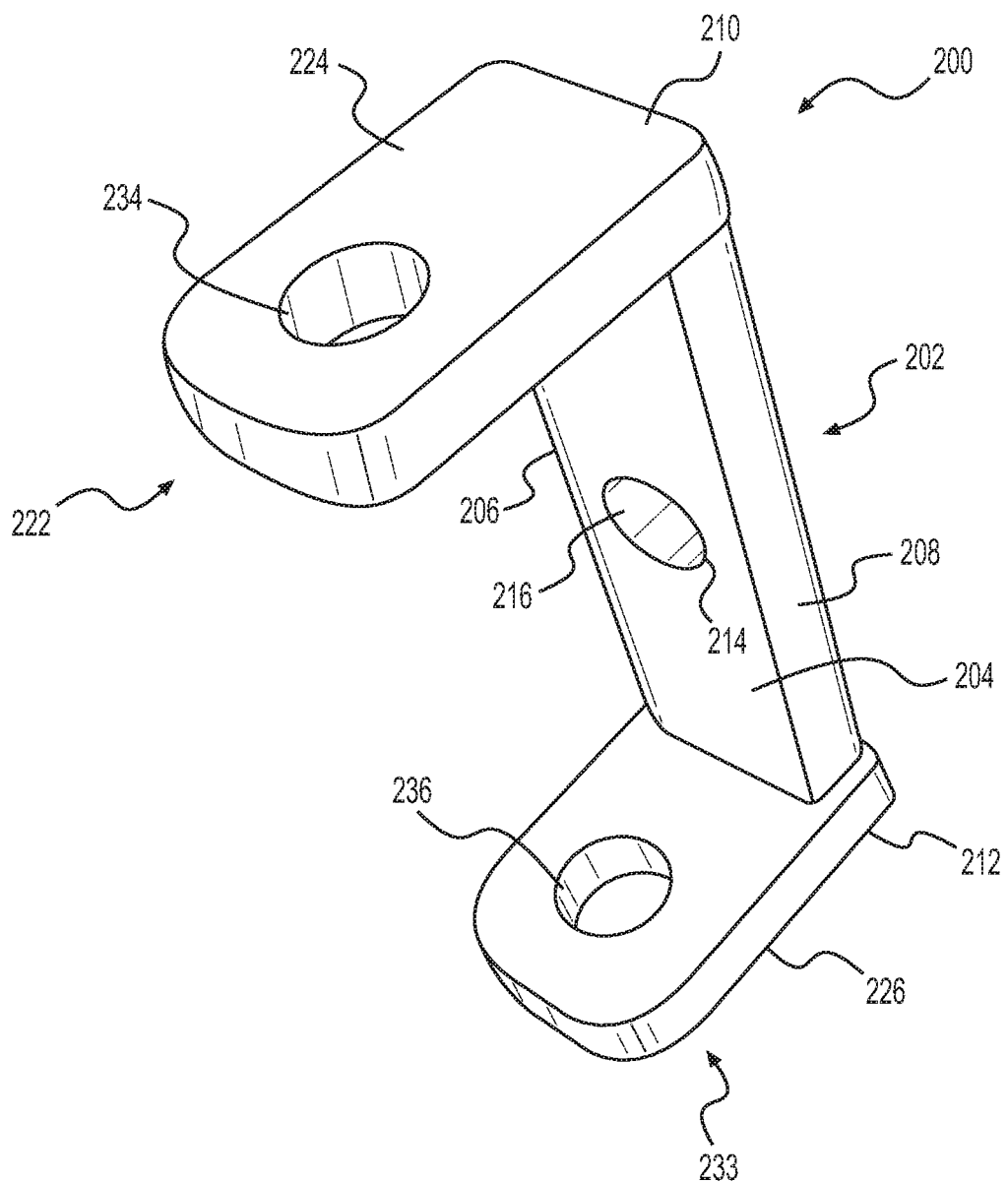
FIG. 5 illustrates a perspective view of another mounting bracket encompassing aspects of the present disclosure.
Figure 6:
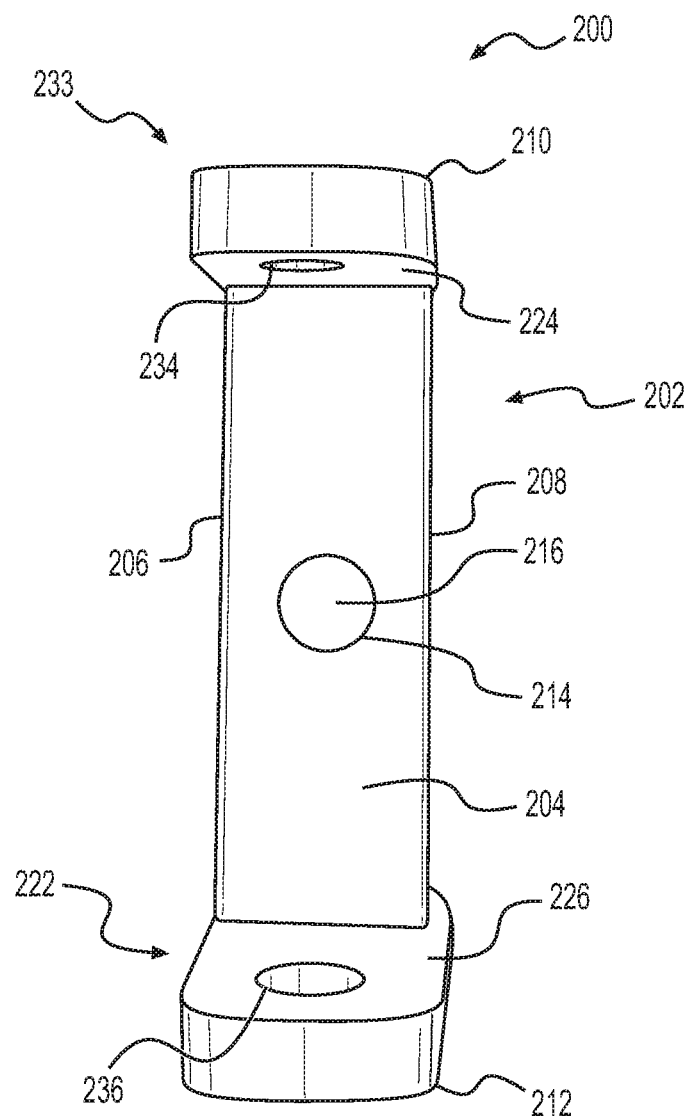
FIG. 6 illustrates a front perspective view of the mounting bracket shown in FIG. 5.

FIGS. 5 and 6 illustrates another mounting bracket 200 encompassing aspects of the present invention. The mounting bracket 200 comprises a body 202 formed of a weather resistant material, such as galvanized steel. The body 202 comprises a face 204, a first side 206 disposed on one side of the face 204, a second side 208 opposing the first side 206, a top side 210, and a bottom side 212 opposing the top side 210. A lip 214 is formed in the face 204 and defines a fastener opening 216 that can receive a bolt, pin, or similar fastener by which the mounting bracket 200 can be attached to a utility pole 160.

The mounting bracket 200 also comprises a plurality of arms 222 connected to the body 202. The plurality of arms 222 comprises a first arm 224 disposed at the top side 210 of the body 20s and a second arm 226 disposed at the bottom side 212 of the body 202. The mounting bracket 200 further comprises a plurality of hooks 233. The plurality of hooks 233 comprises a first hook 234 formed on the first arm 224 and a second hook 236 formed on the second arm 226. The first arm 224 and the second arm 226 are aligned perpendicular to the face 204 of the body and extend outward therefrom. The first arm 224 is aligned parallel to the second arm 226.

Figure 7:
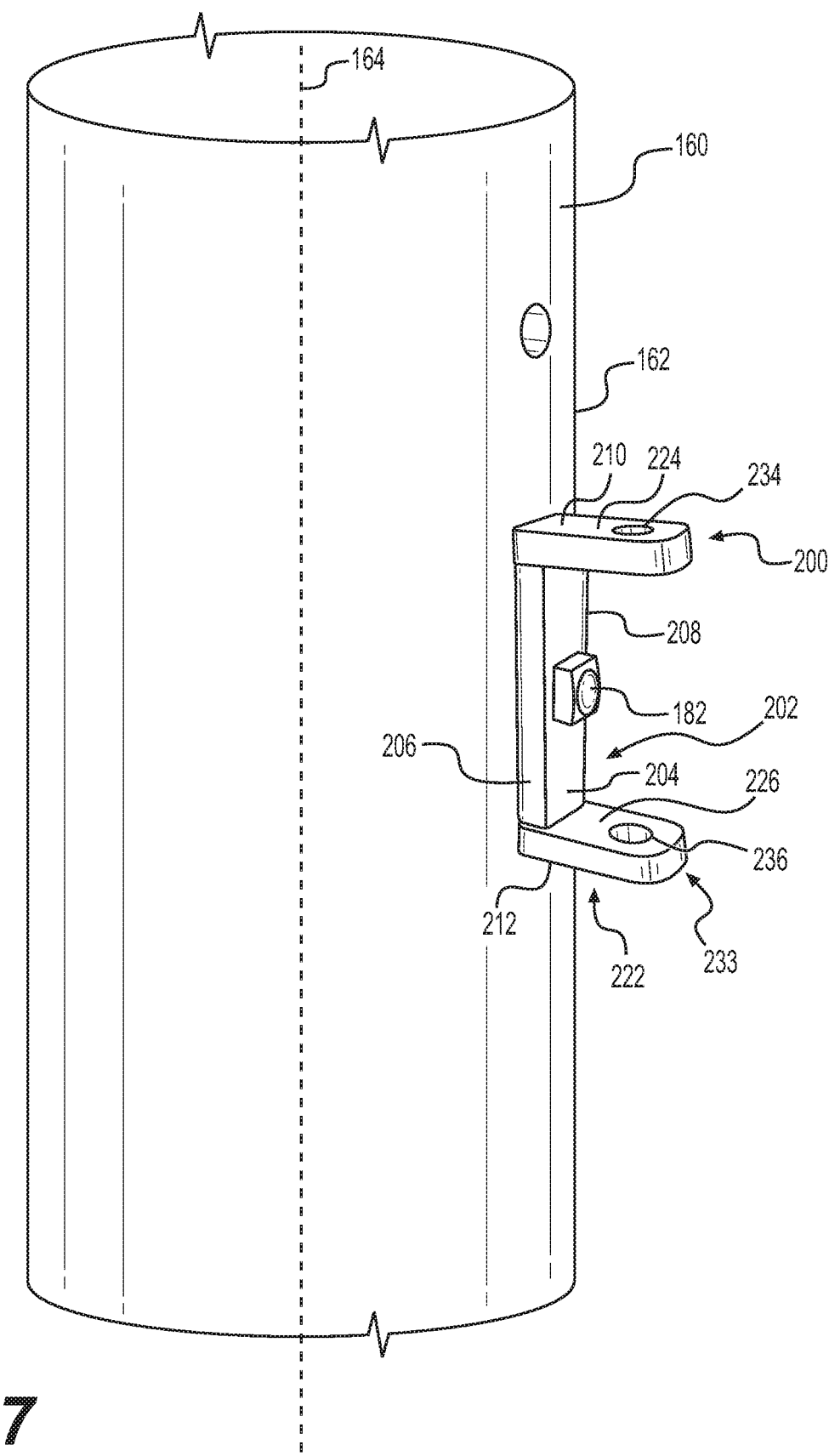
FIG. 7 illustrates a perspective view of the mounting bracket shown in FIG. 5 mounted with a bolt to a utility pole.

FIG. 7 illustrates the mounting bracket 200 mounted to the side 162 of a utility pole 160. The body 202 of the mounting bracket 200 is aligned adjacent the side 162 of the utility pole 160 with the face 204 aligned distal to the side 162 and facing outward from the utility pole 160. The first arm 224 and the second arm 226 are aligned perpendicular to the axis 164 of the utility pole 160. The mounting bracket 100 is mounted to the side 162 of the utility pole 160 by fastener 182. The fastener 182 is aligned in and extends through the fastener opener 216 formed in the face 204 of the body 202. The fastener 182 is anchored in the utility pole 160, thereby securing the mounting bracket 200 to the utility pole 160.

Figure 8A:
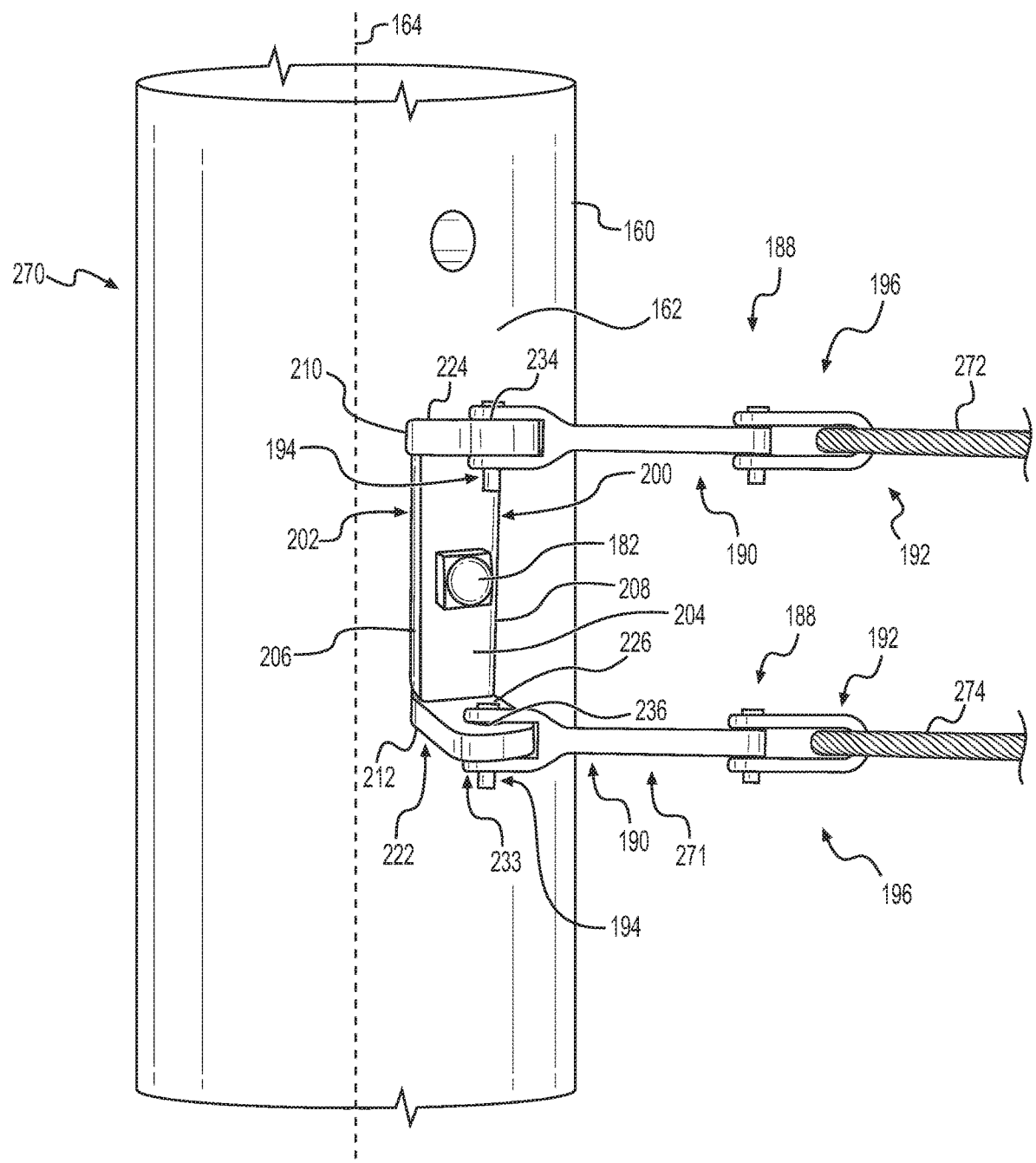
FIG. 8A illustrates a front perspective view of the mounting bracket shown in FIG. 5 mounted with a bolt to a utility pole and a plurality of utility lines mounted to the utility pole via the mounting bracket thereby forming yet another mounting system for dead-end utility lines encompassing aspects of the present disclosure.

FIG. 8A illustrates another mounting bracket system 270 for dead-end utility lines. The mounting bracket system 270 comprises the utility pole 160, the mounting bracket 200 mounted thereto, and a plurality of dead-end utility lines 271 mounted to the utility pole 160 by the mounting bracket 100. The plurality of dead-end utility lines 271 comprises a first dead-end utility line 272 connected to the first hook 234 on the first arm 224 and a second dead-end utility line 274 connected to the second hook 236 on the second arm 226.

Each of the first dead-end utility line 272 and the second dead-end utility line 274 are connected to the first hook 234 and the second hook 236, respectively, by extension link assemblies 188. Each of the two extension link assemblies 188 shown in FIG. 8A comprises an extension link 190 to which is attached a thimble clevis 192 attached to a first end of the extension link 190 and an extension pin 194 connected to the second end of the extension link 188 and threaded through the respective hook 234 and 236 of the mounting bracket 200. Each of the first dead-end utility line 272 and the second dead-end utility line 274 comprises a loop formed on the end thereof that engages the respective thimble clevis 192, thereby forming dead-end utility line assemblies 196. Alternatively, the loop of each dead-end utility line of the plurality of dead-end utility lines 271 can extends through the corresponding hook on the arm of the mounting bracket 200 to which the dead-end utility line is connected, thereby making the connection direct. The mounting bracket 200 is connected by the fastener 182 to the utility pole 160.

Figure 8B:
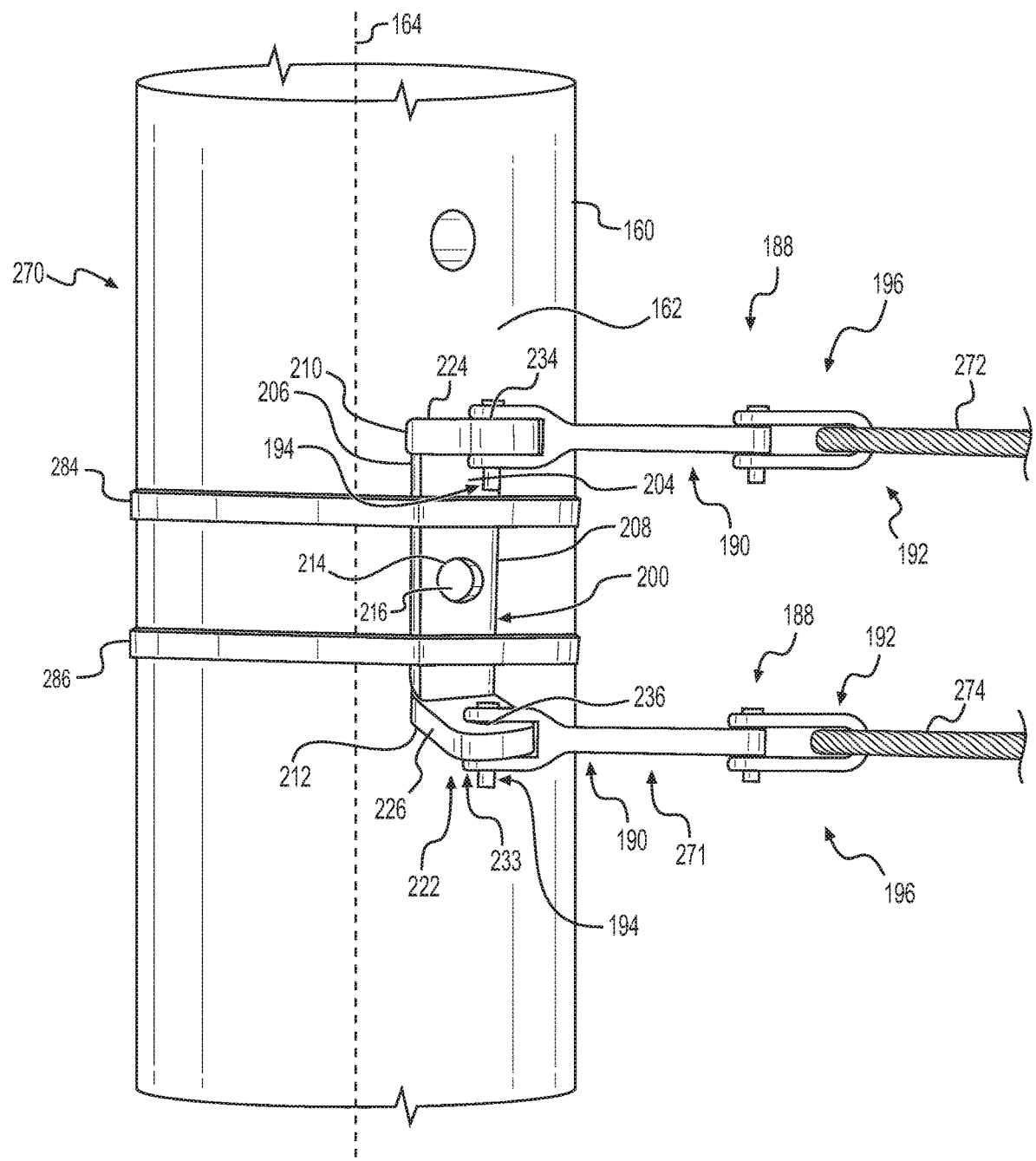
FIG. 8B illustrates a front perspective view of the mounting bracket shown in FIG. 5 mounted with two straps to a utility pole and a plurality of utility lines mounted to the utility pole via the mounting bracket thereby forming still another mounting system for dead-end utility lines encompassing aspects of the present disclosure.

FIG. 8B illustrates the mounting bracket system 270 for dead-end utility lines with the mounting bracket 200 connected to the utility pole 160 by a first strap 284 and a second strap 286, instead of the fastener 182. Each of the first strap 284 and the second strap 286 extend completely and tightly around the side 162 of the utility pole 160 and across the face 204 of the body 202 of the mounting bracket 200, thereby securing the mounting bracket 200 to the utility pole 160. A single strap to secure the mounting bracket 200 to the utility pole 160 is also encompassed by the present disclosure.

The mounting brackets encompassed by the present disclosure are constructed with a strength rating of approximately 10,000 lbs. (approximately 4535 kg), so as to withstand the loads and forces placed thereon.

It will be apparent to those skilled in the art that various modifications and variations can be made to the mounting brackets and mounting bracket systems set forth herein and such modifications and variations are contemplated and encompassed by the present disclosure.

What is claimed is:

1. A mounting bracket for mounting a plurality of dead-end utility lines to a utility pole comprising:
    a body comprising a first side, a second side opposing the first side, a top side, a bottom side opposing the top side, and a front face disposed between the first side, the second side, the top side and the bottom side, wherein the front face comprises a lip, wherein the lip defines a single fastener opening; and,
    a plurality of arms extending from the body, wherein the plurality of arms comprises a first arm and a second arm, wherein the first arm is aligned parallel to the second arm, and wherein each arm of the plurality of arms comprises a hook configured to receive a dead-end utility line of the plurality of dead-end utility lines, wherein the mounting bracket is configured to be mounted to the utility pole, wherein the mounting bracket is configured to receive the plurality of dead-end utility lines, wherein the mounting bracket is configured to mount the plurality of dead-end utility lines to the utility pole, and wherein the mounting bracket is configured to have a strength rating of at least 10,000 lbs. to withstand the load of the plurality of dead-end utility lines.

2. The mounting bracket for mounting dead-end utility lines to a utility pole of claim 1, wherein an arm of the plurality of arms is aligned perpendicular to the front face of the body.

3. The mounting bracket for mounting dead-end utility lines to a utility pole of claim 1, wherein the plurality of arms further comprises a third arm aligned non-parallel to the first arm.

4. The mounting bracket for mounting dead-end utility lines to a utility pole of claim 3, wherein the plurality of arms further comprises a fourth arm.

5. The mounting bracket for mounting dead-end utility lines to a utility pole of claim 4, wherein the fourth arm is aligned parallel to the third arm.

6. The mounting bracket for mounting dead-end utility lines to a utility pole of claim 5, wherein the plurality of arms further comprises a fifth arm, and wherein the fifth arm is aligned non-parallel to the first arm.

7. A mounting bracket for mounting a plurality of dead-end utility lines to a utility pole comprising:
    a body comprising a first side, a second side opposing the first side, a top side, a bottom side opposing the top side, and a front face disposed between the first side, the second side, the top side and the bottom side; and,
    a plurality of arms extending from the body, wherein the plurality of arms comprises a first arm, a second arm, a third arm, a fourth arm, and a fifth arm, and wherein each arm of the plurality of arms comprises a hook configured to receive a dead-end utility line of the plurality of dead-end utility lines, wherein the mounting bracket is configured to be mounted to the utility pole, wherein the mounting bracket is configured to receive the plurality of dead-end utility lines, wherein the mounting bracket is configured to mount the plurality of dead-end utility lines to the utility pole, and wherein the mounting bracket is configured to have a strength rating of at least 10,000 lbs. to withstand the load of the plurality of dead-end utility lines.

8. The mounting bracket of claim 7, wherein the first arm is aligned parallel to the second arm.

9. The mounting bracket of claim 8, wherein the third arm is aligned parallel to the fourth arm.

10. The mounting bracket of claim 9, where the fifth arm is aligned perpendicular to the first arm.

11. The mounting bracket of claim 7, wherein the fifth arm is aligned perpendicular to the front face.

* * * * *